(12) United States Patent
Jungwirth et al.

(10) Patent No.: US 8,996,203 B2
(45) Date of Patent: Mar. 31, 2015

(54) SEARCHLIGHT LOCATION SYSTEM

(75) Inventors: Douglas R. Jungwirth, Porter Ranch, CA (US); Gregory A. Campbell, Granada Hills, CA (US); Emilio Quezada, Sylmar, CA (US); Robert D. Moss, Sylmar, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 13/437,007

(22) Filed: Apr. 2, 2012

(65) Prior Publication Data

US 2013/0261849 A1 Oct. 3, 2013

(51) Int. Cl.
*G01C 23/00* (2006.01)
*G06F 7/00* (2006.01)
*B64D 47/02* (2006.01)

(52) U.S. Cl.
CPC ..................................... *B64D 47/02* (2013.01)
USPC .................................................. 701/3; 701/1

(58) Field of Classification Search
CPC ........ B64D 47/02; B64D 47/08; B63B 45/02; F21S 8/003; G08G 1/096775; G08G 1/22; G01C 1/3697; G05D 1/0061; G05D 1/0858; B60R 1/00; G03B 15/006; F41A 27/28; F41D 5/14
USPC ................ 701/3, 7, 532, 14, 49; 340/539.13; 345/419; 362/287; 434/38; 382/104; 396/12; 342/61
See application file for complete search history.

(56) References Cited

U.S. PATENT DOCUMENTS

| 2,669,703 | A | * | 2/1954 | Hammond, Jr. et al. ...... 340/956 |
| 4,115,841 | A | | 9/1978 | Alexander |
| 4,400,764 | A | * | 8/1983 | Kenyon ......................... 362/263 |
| 5,001,646 | A | * | 3/1991 | Caldwell et al. ................... 701/7 |
| 5,415,549 | A | * | 5/1995 | Logg ............................... 434/38 |
| 5,589,901 | A | * | 12/1996 | Means ............................ 396/12 |
| 5,616,031 | A | * | 4/1997 | Logg ............................... 434/38 |
| 6,315,435 | B1 | | 11/2001 | Hamilton et al. |

(Continued)

FOREIGN PATENT DOCUMENTS

| CN | 102340905 A | 2/2012 |
| GB | 2479437 A | 10/2011 |

(Continued)

OTHER PUBLICATIONS

GB1305958.9 Combined Search and Examination Report, Sep. 25, 2013.

*Primary Examiner* — Tuan C. To
*Assistant Examiner* — Yuri Kan
(74) *Attorney, Agent, or Firm* — Ameh IP; Elahe Toosi; Lowell Campbell (57) ABSTRACT

Systems and methods for identifying a location illuminated by an onboard searchlight on a vehicle are presented. A location of interest is illuminated at an illuminated location illuminated by the onboard searchlight, and a vehicle position of the vehicle and the onboard searchlight is determined. A vehicle orientation of the vehicle is determined based on a pitch, roll, and yaw of the vehicle, and an azimuth and an elevation of the onboard searchlight light is recorded to provide a recorded azimuth and elevation data. A pointing coordinate for the onboard searchlight illuminating the illuminated location is computed based on the vehicle orientation, the vehicle position, and the recorded azimuth and the elevation data, and the illuminated location is calculated based on the pointing coordinate.

20 Claims, 6 Drawing Sheets

(56) References Cited

U.S. PATENT DOCUMENTS

| | | |
|---|---|---|
| 7,245,251 B2 * | 7/2007 | Vogel et al. .................... 342/61 |
| 2007/0091609 A1 * | 4/2007 | Solberg et al. ................ 362/287 |
| 2010/0021011 A1 * | 1/2010 | Shida ............................ 382/104 |
| 2010/0073363 A1 * | 3/2010 | Densham et al. ............. 345/419 |
| 2011/0148623 A1 * | 6/2011 | Bishop et al. ............ 340/539.13 |
| 2011/0288770 A1 * | 11/2011 | Greasby ....................... 701/208 |

FOREIGN PATENT DOCUMENTS

| | | |
|---|---|---|
| JP | 2006138681 A | 6/2006 |
| WO | 93/11407 A1 | 6/1993 |

* cited by examiner

SEARCHLIGHT LOCATION SYSTEM

FIELD

Embodiments of the present disclosure relate generally to methods and systems for finding a location and, more particularly, embodiments of the present disclosure relate to finding a location via a searchlight.

BACKGROUND

During normal night time operation of a searchlight on a helicopter, an operator/pilot may not be familiar with a street address of areas he/she is flying over. Even with a Global Positioning System (GPS), an exact location of interest may be unclear. Crude use of moving map technologies and GPS allow pilots to have some knowledge of specific locations, but generally only those directly under them. Pilots may not be allowed to hover directly over a target location, so the moving map technologies may not be sufficiently accurate.

SUMMARY

Systems and methods for identifying a location illuminated by an onboard searchlight on a vehicle are disclosed. A location of interest is illuminated at an illuminated location illuminated by the onboard searchlight, and a vehicle position of the vehicle and the onboard searchlight is determined. A vehicle orientation of the vehicle is determined based on a pitch, roll, and yaw of the vehicle, and an azimuth and an elevation of the onboard searchlight light is recorded to provide a recorded azimuth and elevation data. A pointing coordinate for the onboard searchlight illuminating the illuminated location is computed based on the vehicle orientation, the vehicle position, and the recorded azimuth and the elevation data, and the illuminated location is calculated based on the pointing coordinate.

In this way, a location (e.g., an address) of interest is determined using a searchlight onboard a vehicle. The location may be determined by illuminating a location of interest whose address in not known. Alternatively, the vehicle may be guided to the location to be illuminated whose address is identified but a ground location is not identified.

In an embodiment, a system for pointing a searchlight onboard a vehicle comprises a position determination module, an airborne mobile platform module, an electronic moving map module, and a searchlight pointing module. The position determination module determines a vehicle position of the vehicle and an onboard searchlight. The airborne mobile platform module determines a vehicle orientation of the vehicle based on a pitch, a roll, and a yaw of the vehicle. The electronic moving map module receives a desired destination to be illuminated by the onboard searchlight, computes a route to the desired destination based on the vehicle orientation and the vehicle position. The electronic moving map module further guides the vehicle to the desired destination to be illuminated by the onboard searchlight.

The searchlight pointing module records an azimuth and an elevation of the onboard searchlight to provide a recorded azimuth and elevation data. The searchlight pointing module further computes a pointing coordinate for the onboard searchlight based on the desired destination, the vehicle orientation, the route, and the recorded azimuth and elevation data. The searchlight pointing module further points the onboard searchlight to the desired destination to be illuminated using a maneuvering mechanism.

In another embodiment, a method for pointing a searchlight onboard a vehicle determines a vehicle position of the vehicle and an onboard searchlight, and determines a vehicle orientation of the vehicle based on a pitch, a roll, and a yaw of the vehicle. The method further identifies a desired destination to be illuminated by the onboard searchlight, and computes a route to the desired destination to be illuminated based on the vehicle orientation and the vehicle position. The method further guides the vehicle to the desired destination to be illuminated by the onboard searchlight, and records an azimuth and an elevation of the onboard searchlight light to provide recorded azimuth and elevation data. The method further computes a pointing coordinate for the onboard searchlight based on the desired destination, the orientation, the route and the recorded azimuth and the elevation data, and points the onboard searchlight to the desired destination to be illuminated using a maneuvering mechanism based on the pointing coordinate.

In a further embodiment, a method for identifying a location illuminated by an onboard searchlight on a vehicle illuminates a location of interest at an illuminated location illuminated by the onboard searchlight. The method further determines a vehicle position of the vehicle and the onboard searchlight, and determines a vehicle orientation of the vehicle based on a pitch, a roll, and a yaw of the vehicle. The method further records an azimuth and an elevation of the onboard searchlight light to provide recorded azimuth and elevation data. The method further computes a pointing coordinate for the onboard searchlight illuminating the illuminated location based on the vehicle orientation, the vehicle position, and the recorded azimuth and the elevation data. The method further calculates the illuminated location based on the pointing coordinate.

In a further embodiment, a system for identifying a location illuminated by a searchlight onboard a vehicle comprises an onboard searchlight, a position determination module, an airborne mobile platform module, a searchlight pointing module, and an electronic moving map module. The onboard searchlight illuminates a location of interest at an illuminated location. The position determination module determines a vehicle position of the vehicle and the onboard searchlight. The searchlight pointing module records an azimuth and an elevation of the onboard searchlight to provide recorded azimuth and elevation data, and computes a pointing coordinate for the onboard searchlight illuminating the illuminated location based on the vehicle orientation, the vehicle position, and the recorded azimuth and the elevation data. The electronic moving map module calculates the illuminated location based on the pointing coordinate.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF DRAWINGS

A more complete understanding of embodiments of the present disclosure may be derived by referring to the detailed description and claims when considered in conjunction with the following figures, wherein like reference numbers refer to similar elements throughout the figures. The figures are provided to facilitate understanding of the disclosure without limiting the breadth, scope, scale, or applicability of the disclosure. The drawings are not necessarily made to scale.

DETAILED DESCRIPTION

The following detailed description is exemplary in nature and is not intended to limit the disclosure or the application and uses of the embodiments of the disclosure. Descriptions of specific devices, techniques, and applications are provided only as examples. Modifications to the examples described herein will be readily apparent to those of ordinary skill in the art, and the general principles defined herein may be applied to other examples and applications without departing from the spirit and scope of the disclosure. The present disclosure should be accorded scope consistent with the claims, and not limited to the examples described and shown herein.

Embodiments of the disclosure may be described herein in terms of functional and/or logical block components and various processing steps. It should be appreciated that such block components may be realized by any number of hardware, software, and/or firmware components configured to perform the specified functions. For the sake of brevity, conventional techniques and components related to searchlights, location tracking techniques, optical sensors, data transmission, signaling, network control, and other functional aspects of the systems (and the individual operating components of the systems) may not be described in detail herein. In addition, those skilled in the art will appreciate that embodiments of the present disclosure may be practiced in conjunction with a variety of hardware and software, and that the embodiments described herein are merely example embodiments of the disclosure.

Embodiments of the disclosure are described herein in the context of a practical non-limiting application, namely, a searchlight on board a helicopter. Embodiments of the disclosure, however, are not limited to such helicopter application, and the techniques described herein may also be utilized in other applications. For example but without limitation, embodiments may be applicable to unmanned aerial vehicles (UAVs), a piloted aircraft (e.g., a fixed wing or a rotorcraft), a satellite, a ship, a boat, a submarine, a surface vehicle (e.g., an automobile), a robotic vehicle, an spacecraft, an autonomous robotic vehicle, or other vehicle capable of maneuvering along a route or path.

As would be apparent to one of ordinary skill in the art after reading this description, the following are examples and embodiments of the disclosure and are not limited to operating in accordance with these examples. Other embodiments may be utilized and structural changes may be made without departing from the scope of the exemplary embodiments of the present disclosure.

Figure 1:
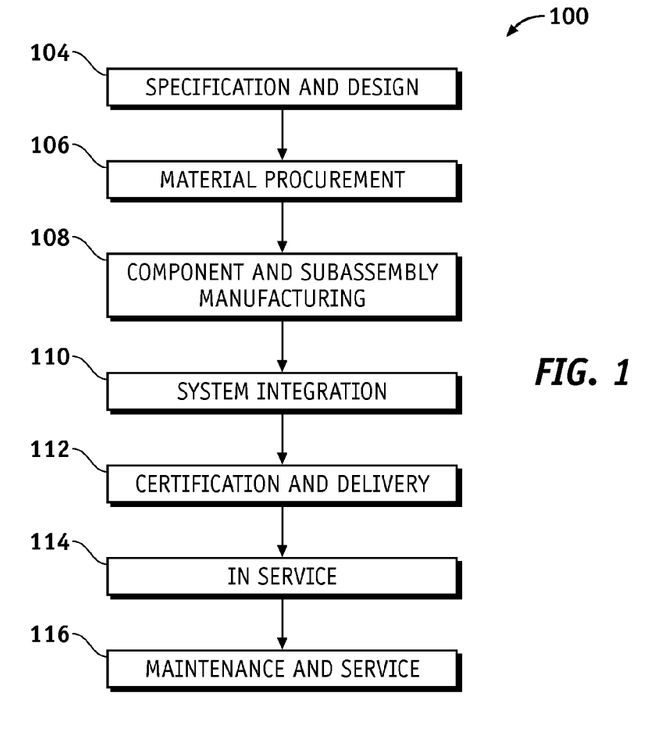
FIG. 1 is an illustration of a flow diagram of an exemplary aircraft production and service methodology.
Figure 2:
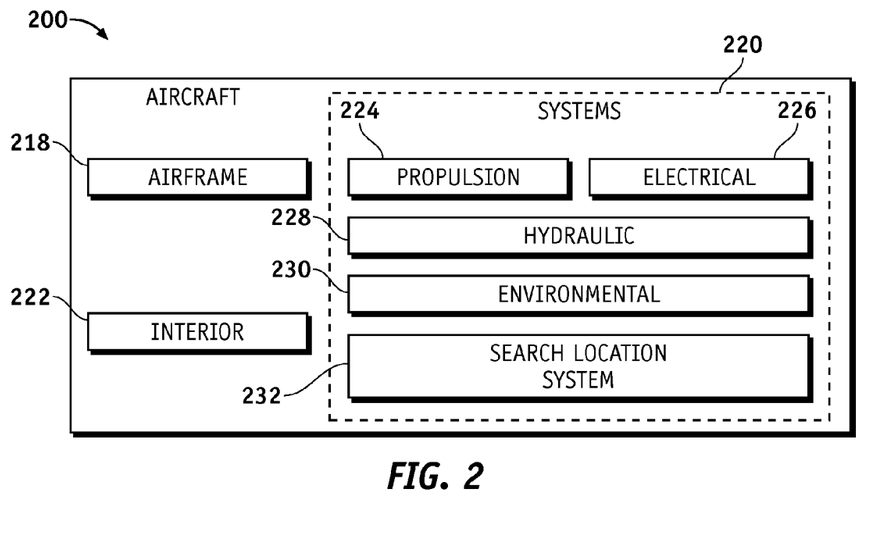
FIG. 2 is an illustration of an exemplary block diagram of an aircraft.

Referring more particularly to the drawings, embodiments of the disclosure may be described in the context of an aircraft manufacturing and service method 100 (method 100) as shown in FIG. 1 and an aircraft 200 as shown in FIG. 2. During pre-production, the exemplary method 100 may include specification and design 104 of the aircraft 200 and material procurement 106. During production, component and subassembly manufacturing 108 and system integration 110 of the aircraft 200 takes place. Thereafter, the aircraft 200 may go through certification and delivery 112 in order to be placed in service 114. While in service by a customer, the aircraft 200 is scheduled for routine maintenance and service 116 (which may also include modification, reconfiguration, refurbishment, and so on).

Each of the processes of method 100 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be without limitation an airline, leasing company, military entity, service organization, and the like.

As shown in FIG. 2, the aircraft 200 produced by the exemplary method 100 may include an airframe 218 with a plurality of systems 220 and an interior 222. Examples of high-level systems 220 include one or more of a propulsion system 224, an electrical system 226, a hydraulic system 228, an environmental system 230, and a searchlight location system 232. Any number of other systems may also be included. Although an aerospace example is shown, the embodiments of the disclosure may be applied to other industries.

Apparatus and methods embodied herein may be employed during any one or more of the stages of the production and service method 100. For example, components or subassemblies corresponding to production process 108 may be fabricated or manufactured in a manner similar to components or subassemblies produced while the aircraft 200 is in service. In addition, one or more apparatus embodiments, method embodiments, or a combination thereof may be utilized during the production stages 108 and 110, for example, by substantially expediting assembly of or reducing the cost of an aircraft 200. Similarly, one or more of apparatus embodiments, method embodiments, or a combination thereof may be utilized while the aircraft 200 is in service, for example and without limitation, to maintenance and service 116.

Figure 3:
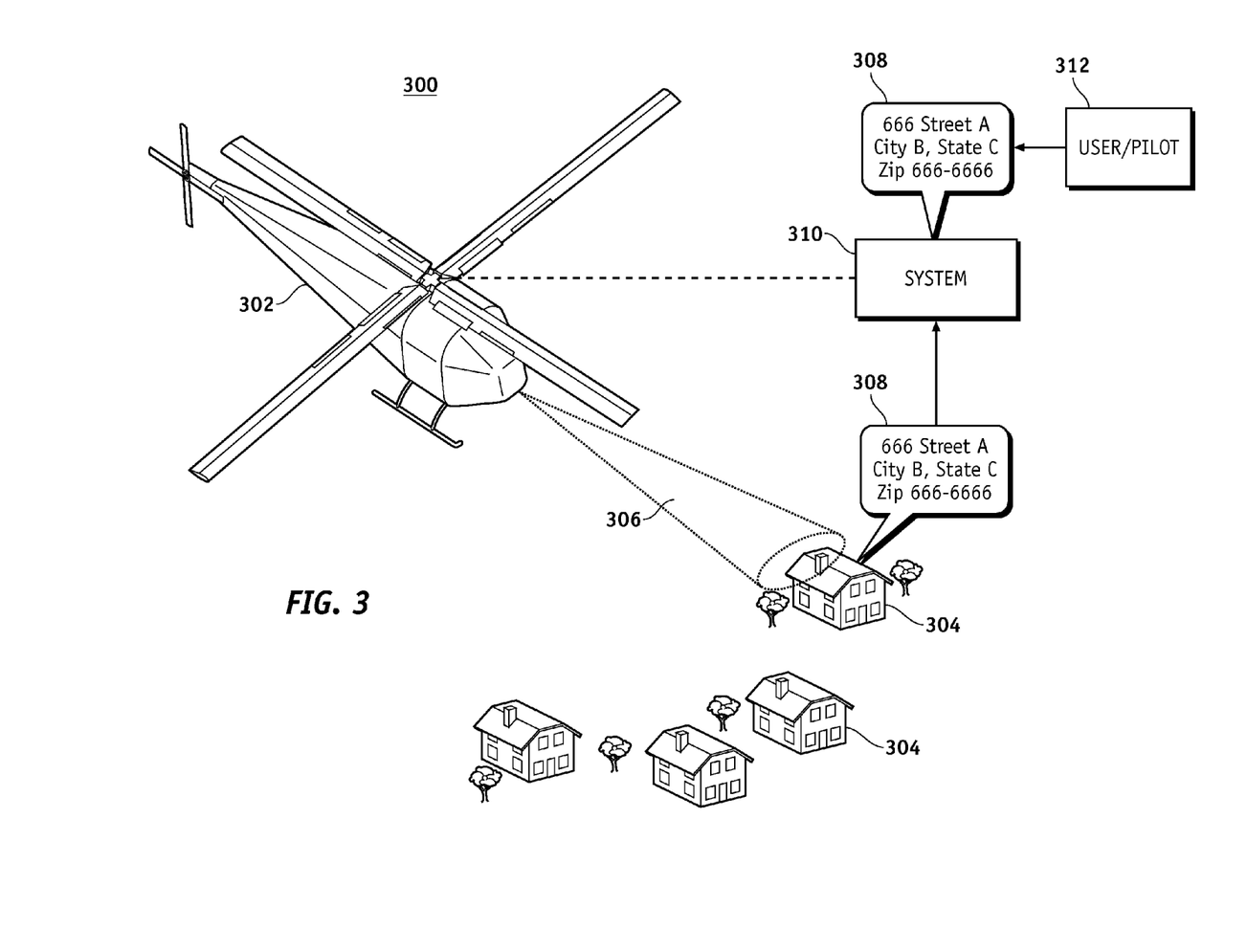
FIG. 3 is an illustration of an exemplary schematic operational environment of a searchlight location system according to an embodiment of the disclosure.

FIG. 3 is an illustration of an exemplary schematic operational environment 300 of a searchlight location system 310 according to an embodiment of the disclosure.

In one embodiment, a helicopter 302 may be illuminating a location 304 of an "occurrence" by the searchlight 306 but does not know an exact street address 308 of the "occurrence". In this case, the searchlight location system 310 determines the exact street address 308 illuminated by the onboard searchlight 306 as explained in more detail in the context of discussion of FIG. 4. In this document, "occurrence" means an occurrence of an event at a location. The exact street address 308 may comprise, for example but without limitation, an address of a house, an address of a parcel of land comprising a location of interest, an address of a building comprising a location of interest, or other address.

In another embodiment, the helicopter 302 may be told a specific location and does not know exactly where that location is in terms of an exact street address 308 (in an unfamiliar area) and/or a longitude and latitude coordinates in an unincorporated area. In this case, the searchlight location system 310, guides the helicopter 302 to the specific location whose address such as the exact street address 308 is identified by the user/pilot 312 but the user/pilot 312 does not know exactly where that location is in terms of a street address (in an unfamiliar area) and/or a longitude and latitude coordinates in an unincorporated area as explained in more detail in the context of discussion of FIG. 5.

Figure 4:
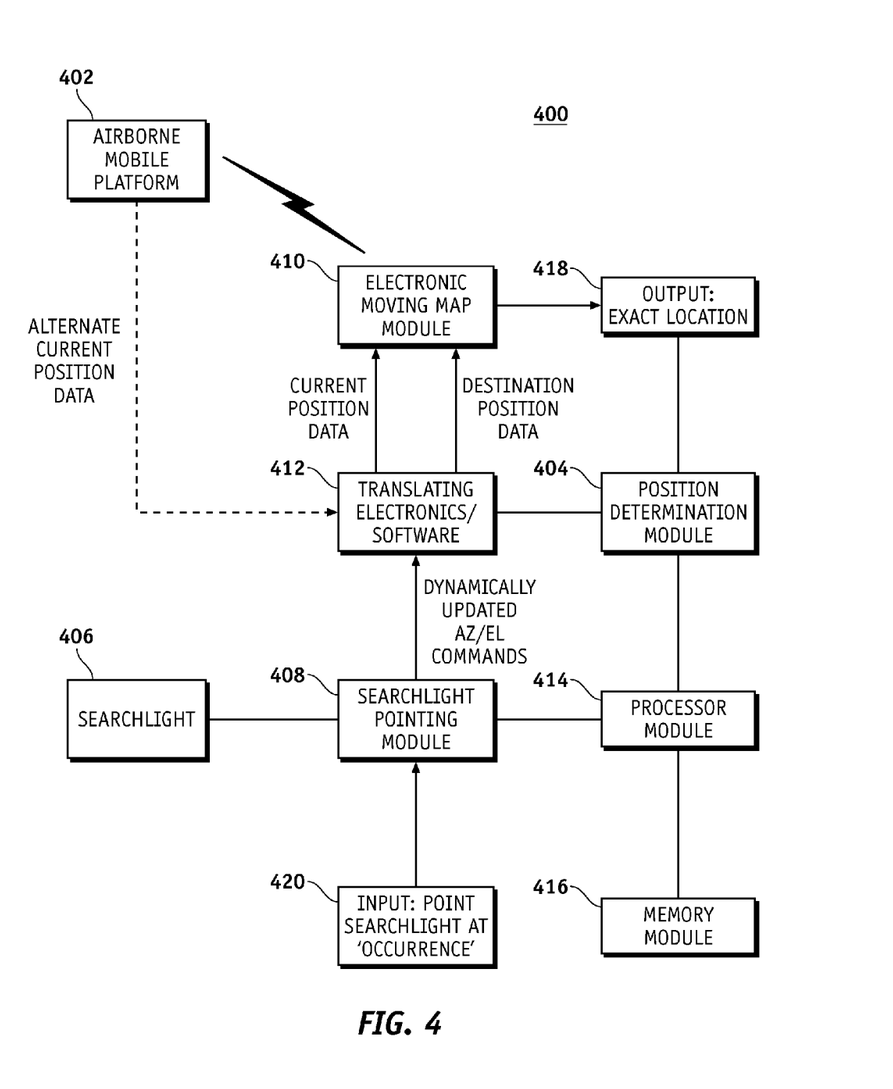
FIG. 4 is an illustration of an exemplary functional block diagram of a searchlight location system according to an embodiment of the disclosure.

FIG. 4 is an illustration of an exemplary functional block diagram of a searchlight location system 400 (302 in FIG. 3) suitable for finding the location 304 (FIG. 3) according to an embodiment of the disclosure. The various illustrative blocks, modules, processing logic, and circuits described in connection with system 400 may be implemented or performed with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein.

The system 400 comprises, an airborne mobile platform module 402, a position determination module 404, an onboard searchlight 406 (306 in FIG. 3), a searchlight pointing module 408, an electronic moving map module 410, a translating electronics/software module 412, a processor module 414, and a memory module 416.

In this embodiment, the searchlight location system 400 (310 in FIG. 3) determines the exact location 418 (308 in FIG. 3) illuminated by the onboard searchlight 406 (306 in FIG. 3).

The airborne mobile platform module 402 records pitch, roll and yaw information to provide orientation of the helicopter 302.

The position determination module 404 determines a position of the helicopter 302 and the onboard searchlight 406 and locates exact longitude and latitude coordinates of the helicopter 302 (including altitude). The position determination module 404 can also calculate a direction to where "occurrence" is based on a location (either street address or longitude and latitude coordinates) given to the (moving) helicopter 302.

The onboard searchlight 406 (306 in FIG. 3) is transmitted by a light transmitter (not shown) to a location such as the location 304 (FIG. 3).

The searchlight pointing module 408 points the onboard searchlight 406 to an exact location 418 and records azimuth and elevation readings on the onboard searchlight 406. In this manner, the searchlight pointing module 408, computes a pointing coordinate for the onboard searchlight 406 based on the desired destination, the orientation, and the recorded azimuth and elevation data, and points and maintains the onboard searchlight 406 to the exact location 418 to be illuminated using a maneuvering mechanism. The exact location 418 may comprise, for example but without limitation, a house, a parcel of land comprising a location of interest, a building comprising a location of interest, or other location.

The electronic moving map module 410 calculates the exact location 418 where the onboard searchlight 406 is hitting the exact location 418. The exact location 418 comprises exact street address and/or longitude and latitude coordinates of the "occurrence". The exact location 418 may be calculated based on the pointing coordinate.

The translating electronics/software module 412 converts data from the position determination module 404, searchlight pointing module 408, and/or the airborne mobile platform module 402 into a form or format usable by the electronic moving map module 410.

The processor module 414 comprises processing logic that is configured to carry out the functions, techniques, and processing tasks associated with the operation of the system 400. In particular, the processing logic is configured to support the system 400 described herein. For example but without limitation, processor module 414 may direct the searchlight pointing module 408 to actively control the onboard searchlight 406 to point at the exact location 304 based on an input 420. For another example but without limitation, the processor module 414 communicates the data between the electronic moving map module 410, the searchlight pointing module 408, and the position determination module. The processor module 414 accesses data stored in the memory module 416, to support functions of the system 400. Thereby, the processor module 414 enables active control of the system 400.

The processor module 414 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

The memory module 416 may be a data storage area with memory formatted to support the operation of the system 400. The memory module 416 is configured to store, maintain, and provide data as needed to support the functionality of the system 400 in the manner described herein. In practical embodiments, the memory module 416 may comprise, for example but without limitation, a non-volatile storage device (non-volatile semiconductor memory, hard disk device, optical disk device, and the like), a random access storage device (for example, SRAM, DRAM), or any other form of storage medium known in the art.

The memory module 416 may be coupled to the processor module 414 and configured to store, for example but without limitation, the exact location 418, the desired destination 502, pitch information, roll information, yaw information, altitude, longitude and latitude coordinates of the helicopter 302, a route to the desired destination 502, a pointing coordinate, a computer program that is executed by the processor module 414, an operating system, an application program, tentative data used in executing a program, and the like. Additionally, the memory module 416 may represent a dynamically updating database containing a table for updating various databases.

The memory module 416 may be coupled to the processor module 414 such that the processor module 414 can read information from and write information to the memory module 416. As an example, the processor module 414 and memory module 416 may reside in respective application specific integrated circuits (ASICs). The memory module 416 may also be integrated into the processor module 414. In an embodiment, the memory module 416 may comprise a cache memory for storing temporary variables or other intermediate information during execution of instructions to be executed by the processor module 414.

In operation, according to the embodiment shown in FIG. 4, a pilot/user illuminates the exact location 418 (location 304 in FIG. 3) by the onboard searchlight 406 pointing to the exact location 418. The position determination module 404 locates exact longitude and latitude coordinates of helicopter 302 (including altitude), the airborne mobile platform system 402 records pitch, roll and yaw information, and the searchlight pointing module 408 records azimuth and elevation readings of the onboard searchlight 406 (306 in FIG. 3). In this manner, the exact location 418 where the onboard searchlight 406 is hitting the ground is identified by, for example, the exact street address 308 (FIG. 3) and/or by a longitude and latitude coordinates via the electronic moving map module 410.

Figure 5:
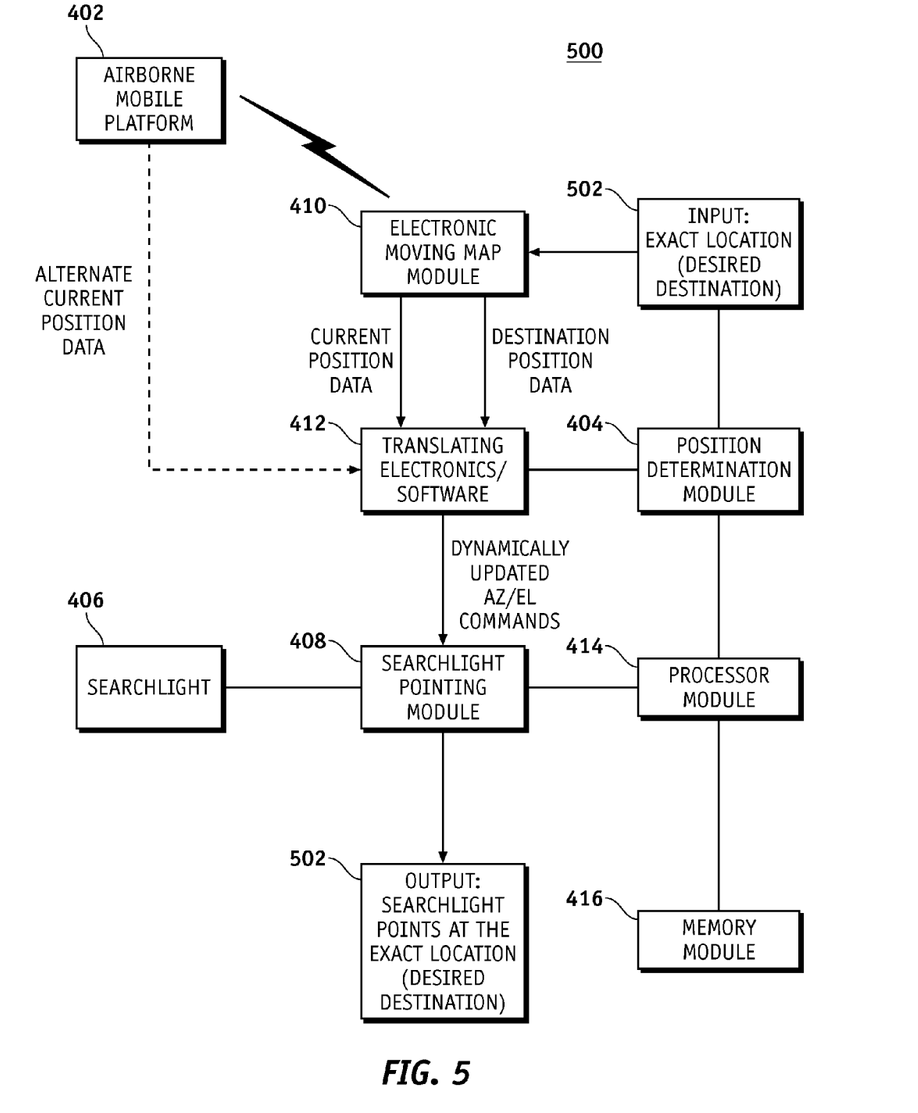
FIG. 5 is an illustration of an exemplary functional block diagram of a searchlight location system according to an embodiment of the disclosure.

FIG. 5 is an illustration of an exemplary functional block diagram of a searchlight location system 500 (310 in FIG. 3) suitable for finding the location 304 (FIG. 3) according to an embodiment of the disclosure. The various illustrative blocks, modules, processing logic, and circuits described in connection with system 500 may be implemented or performed with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein.

The system 500 comprises, the airborne mobile platform module 402, the position determination module 404, the onboard searchlight 406 (306 in FIG. 3), the searchlight pointing module 408, the electronic moving map module 410, the translating electronics/software module 412, the processor module 414, and the memory module 416. System 500 may have functions, material, and structures that are similar to the embodiments shown in system 500. Therefore common features, functions, and elements may not be redundantly described here.

In this embodiment, the searchlight location system 500, guides the helicopter 302 to the specific location whose exact location 502 (308 in FIG. 3) is identified by the user/pilot 312 (FIG. 3) but the user/pilot 312 does not know exactly where the exact location 502 is in terms of an exact street address (in an unfamiliar area) and/or a longitude and latitude coordinates in an unincorporated area.

The position determination module 404 determines a position of the helicopter 302 and the onboard searchlight 406. The position determination module 404 locates exact longitude and latitude coordinates of the helicopter 302 (including altitude). The position determination module 404 calculates a direction to where "occurrence" is based on the exact location 502 (either street address or longitude and latitude coordinates) input to system 500. The position determination module 404 may comprise, for example but without limitation, a GPS system, an inertia reference unit, or other position determination means.

The searchlight pointing module 408 records a dynamically updated azimuth and elevation (AZ/EL) of the onboard searchlight 406 to provide recorded azimuth and elevation data, and computes a pointing coordinate for the onboard searchlight 406 based on the desired destination, the orientation, a route to the exact location 502 (desired destination 502), and the recorded azimuth and elevation data. The searchlight pointing module 408 then points the onboard searchlight 406 to the desired destination 502 to be illuminated using a maneuvering mechanism based on the pointing coordinate. The searchlight pointing module 408 can maintain pointing the onboard searchlight 406 at the desired destination 502. The searchlight pointing module 408 can also guide the vehicle to the desired destination 502 to be illuminated by pointing the onboard searchlight 406 in a direction of the desired destination 502 to be illuminated.

The electronic moving map module 410 calculates a direction/route the onboard searchlight 406 should be aimed to "point" to the desired destination 502 of travel based on the desired destination 502 input to the system 500 by the pilot/user 312. The desired destination 502 comprises the exact street address 308 (FIG. 3) and/or longitude and latitude coordinates of the "occurrence". In this manner, the electronic moving map module 410 receives the desired destination 502 identified by a pilot/user 312 to be illuminated by the onboard searchlight 406, computes the route to the identified desired destination 502 based on the orientation and the position of the helicopter 302.

In one embodiment, the electronic moving map module 410 can guide the helicopter 302 to the desired destination 502 to be illuminated by pointing the onboard searchlight 406 in a direction of the desired destination 502 to be illuminated. The electronic moving map module 410 may guide the helicopter 302 to the desired destination 502 to be illuminated by directing the searchlight pointing module 408 to point the onboard searchlight 406 in a direction of the desired destination 502 to be illuminated.

The processing logic is configured to support the system 500 described herein. For example but without limitation, processor module 414 may direct the searchlight pointing module 408 to actively control the onboard searchlight 406 to point at the exact location 304 based on the desired destination 502. For another example but without limitation, the processor module 414 communicates the data between the electronic moving map module 410, the searchlight pointing module 408, and the position determination module 404. The processor module 414 accesses data stored in the memory module 416, to support functions of the system 500. Thereby, the processor module 414 enables active control of the system 500.

In operation, a location such as the desired destination 502 is input to the electronic moving map module 410 of the system 500 by the pilot/user 312 to provide a desired direction of travel. The position determination module 404 calculates the direction to where "occurrence" is. Pilot/user 312 flies in that general direction, the airborne mobile platform module 402 provides pitch, roll and yaw information, and the searchlight pointing module 408 calculates a direction the onboard searchlight 406 should be aimed to "point" to the desired direction of travel. When the system 500 is close to a target location, the system 500 points to the target location using above information and the onboard searchlight 406 continues to track a specified location as the helicopter 302 circles or approaches from different angle or roll configurations.

Figure 6:
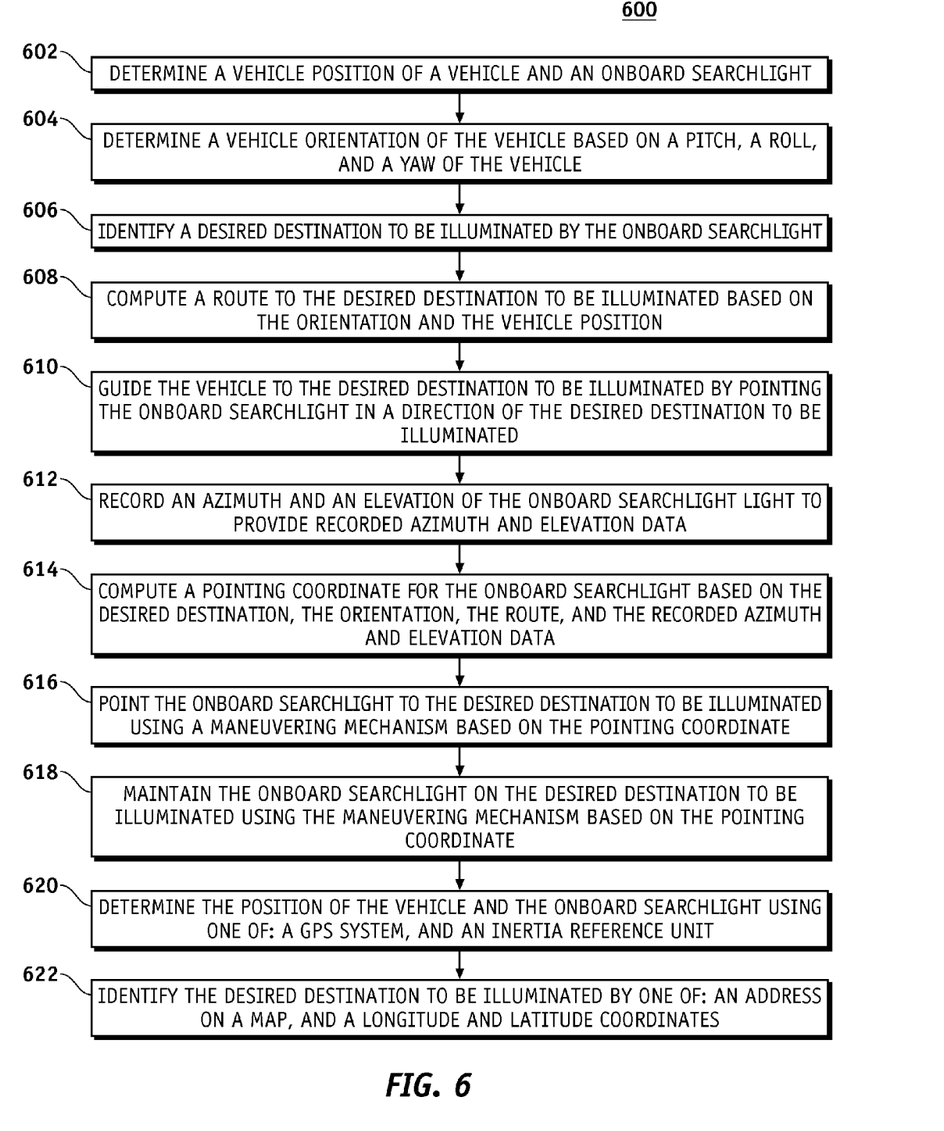
FIG. 6 is an illustration of an exemplary flowchart showing a process for pointing a searchlight onboard a vehicle to a desired destination according to an embodiment of the disclosure.

FIG. 6 is an illustration of an exemplary flowchart showing a process 600 for pointing a searchlight onboard a vehicle to a desired destination according to an embodiment of the disclosure. The various tasks performed in connection with process 600 may be performed mechanically, by software, hardware, firmware, a computer-readable medium having computer executable instructions for performing the process method, or any combination thereof. It should be appreciated that process 600 may include any number of additional or alternative tasks, the tasks shown in FIG. 6 need not be performed in the illustrated order, and process 600 may be incorporated into a more comprehensive procedure or process having additional functionality not described in detail herein.

For illustrative purposes, the following description of process 600 may refer to elements mentioned above in connection with FIGS. 1-5. In practical embodiments, portions of the process 600 may be performed by different elements of the system 500 such as: the airborne mobile platform module 402, the position determination module, the onboard searchlight 406 (306 in FIG. 3), the searchlight pointing module 408, the electronic moving map module 410, the translating electronics/software module 412, the processor module 414, the memory module 416, etc. Process 600 may have functions, material, and structures that are similar to the embodiments shown in FIGS. 1-5. Therefore common features, functions, and elements may not be redundantly described here.

Process 600 may begin by a position determination module such as the position determination module 404 determining a vehicle position of a vehicle such as the helicopter 302 and an onboard searchlight such as the onboard searchlight 306/406 (task 602). A vehicle may comprise, for example but without limitation, an aircraft such as: an unmanned aerial vehicles (UAVs), and a piloted aircraft (e.g., a fixed wing or a rotorcraft), a satellite, a ship, a boat, a submarine, a surface vehicle (e.g., an automobile), a robotic vehicle, an spacecraft, an autonomous robotic vehicle, or other vehicle capable of maneuvering along a route or path.

Process 600 may continue by an airborne mobile platform module such as the airborne mobile platform module 402 determining a vehicle orientation of a vehicle such as the helicopter 302 based on a pitch, a roll, and a yaw of the vehicle (task 604).

Process 600 may continue by identifying a desired destination such as the desired destination 502 to be illuminated by the onboard searchlight 306 (task 606). The desired destination 502 may be identified by, for example but without limitation, a user/pilot on board the vehicle, a user/pilot remotely controlling the vehicle, the processor module 414, a preprogrammed input from the processor module 414, information received by the processor module 414, or other means.

Process 600 may continue by an electronic moving map module such as the electronic moving map module 410 computing a route to the desired destination 502 to be illuminated based on the vehicle orientation and the vehicle position (task 608).

Process 600 may continue by the electronic moving map module 410 guiding the vehicle to the desired destination 502 to be illuminated by pointing the onboard searchlight 306/406 in a direction of the desired destination to be illuminated (task 610). The direction may comprise, for example but without limitation, a street direction, a direction of a landmark, a direction pointing at the desired location 502, a direction around an obstruction (e.g., a building), a direction on a path through rugged terrain, or other direction.

Process 600 may continue by the searchlight pointing module 408 recording an azimuth and an elevation of the onboard searchlight light 306/406 to provide a recorded azimuth and elevation data (task 612).

Process 600 may continue by the searchlight pointing module 408 computing a pointing coordinate for the onboard searchlight based on the desired destination 502, the vehicle orientation, the route, and the recorded azimuth and the elevation data (task 614).

Process 600 may continue by the searchlight pointing module 408 pointing the onboard searchlight to the desired destination to be illuminated using a maneuvering mechanism based on the pointing coordinate (task 616).

Process 600 may continue by the searchlight pointing module 408 maintaining the onboard searchlight on the desired destination 502 to be illuminated using the maneuvering mechanism based on the pointing coordinate (task 618).

Process 600 may continue by the position determination module 404 determining the position of the vehicle and the onboard searchlight using one of: a GPS system, and an inertia reference unit (task 620).

Process 600 may continue by the user/pilot 312 identifying the desired destination 502 to be illuminated by one of: an address on a map, and a longitude and latitude coordinates (task 622).

Figure 7:
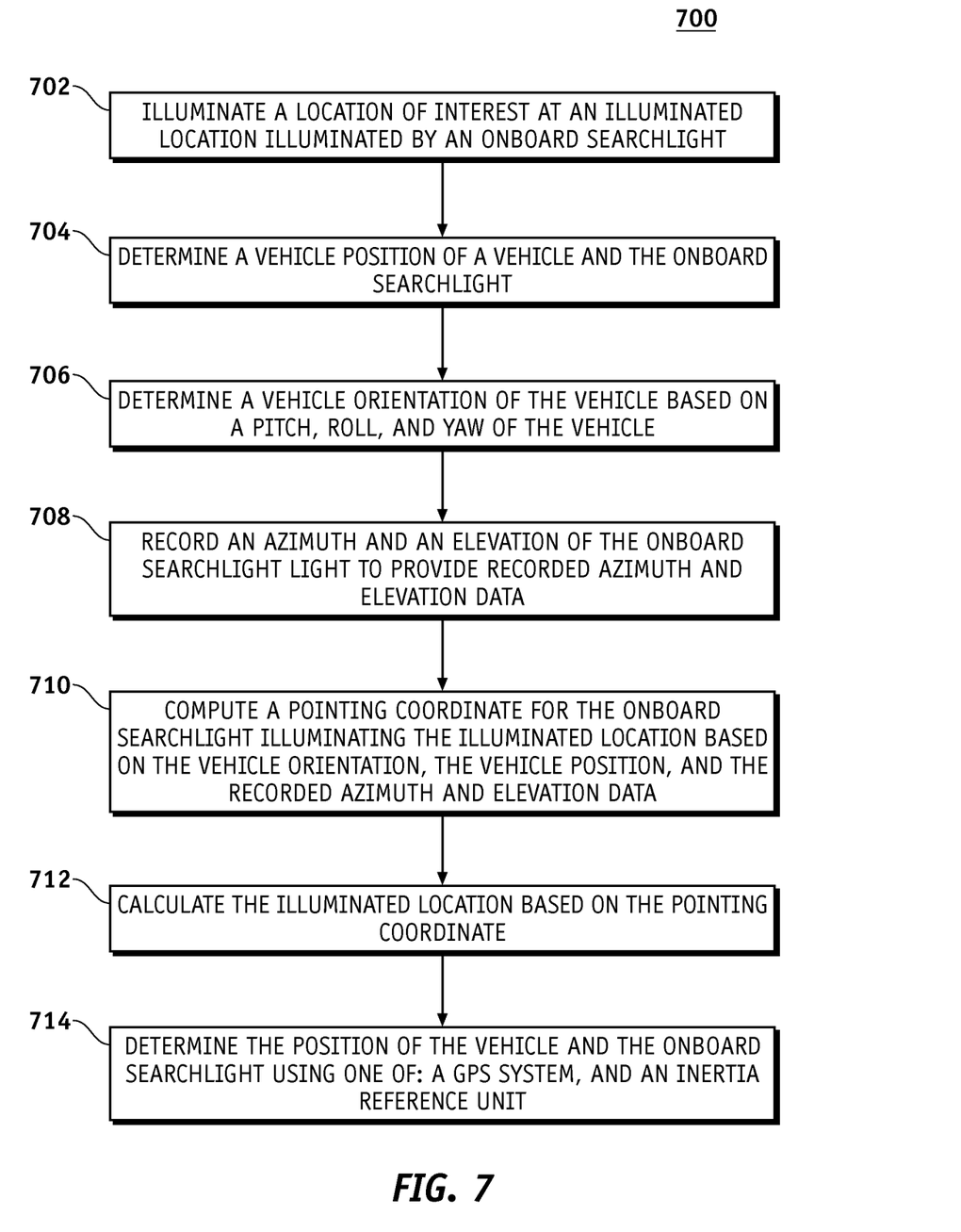
FIG. 7 is an illustration of an exemplary flowchart showing a process for identifying a location illuminated by a searchlight on a vehicle according to an embodiment of the disclosure.

FIG. 7 is an illustration of an exemplary flowchart showing a process 700 for identifying a location illuminated by a searchlight on a vehicle according to an embodiment of the disclosure. The various tasks performed in connection with process 700 may be performed mechanically, by software, hardware, firmware, a computer-readable medium having computer executable instructions for performing the process method, or any combination thereof. It should be appreciated that process 700 may include any number of additional or alternative tasks, the tasks shown in FIG. 7 need not be performed in the illustrated order, and process 700 may be incorporated into a more comprehensive procedure or process having additional functionality not described in detail herein.

For illustrative purposes, the following description of process 700 may refer to elements mentioned above in connection with FIG. 1-5. In practical embodiments, portions of the process 700 may be performed by different elements of the system 400 such as: the airborne mobile platform module 402, the position determination module 404, the onboard searchlight 406 (306 in FIG. 3), the searchlight pointing module 408, the electronic moving map module 410, the translating electronics/software module 412, the processor module 414, and the memory module 416, etc. Process 700 may have functions, material, and structures that are similar to the embodiments shown in FIGS. 1-5. Therefore common features, functions, and elements may not be redundantly described here.

Process 700 may begin by Illuminating a location of interest such as the exact location 304/418 at an illuminated location illuminated by an onboard searchlight such as the onboard searchlight 306/406 (task 702).

Process 700 may continue by a position determination module such as the position determination module 404 determining a vehicle position of a vehicle such as the helicopter 302 and the onboard searchlight 306/406 (task 704).

Process 700 may continue by an airborne mobile platform module such as the airborne mobile platform module 402 determining a vehicle orientation of the vehicle based on a pitch, roll, and yaw of the vehicle (task 706).

Process 700 may continue by a searchlight pointing module such as the searchlight pointing module 408 recording an azimuth and an elevation of the onboard searchlight light to provide a recorded azimuth and elevation data (task 708).

Process 700 may continue by the searchlight pointing module 408 computing a pointing coordinate for the onboard searchlight illuminating the illuminated location based on the vehicle orientation, the vehicle position, and the recorded azimuth and the elevation data (task 710). The pointing coordinate may comprise, for example but without limitation, a vector, a spherical coordinate (r, θ, φ), a Cartesian coordinate (XYZ), or other pointing coordinate.

Process 700 may continue by an electronic moving map module such as the electronic moving map module 410 calculating the illuminated location based on the pointing coordinate (task 712).

Process 700 may continue by the position determination module 404 determining the position of the vehicle and the onboard searchlight using one of: a GPS system, and an inertia reference unit (task 714).

In this way, a location (e.g., an address) of interest is determined using a searchlight onboard a vehicle. The location may be determined by illuminating a location of interest whose address in not known. Alternatively, the vehicle may be guided to the location to be illuminated whose address is identified but a ground location is not identified.

The above description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although FIGS. 1-5 depict example arrangements of elements, additional intervening elements, devices, features, or components may be present in an embodiment of the disclosure.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; and adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future.

Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise.

Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent. The term "about" when referring to a numerical value or range is intended to encompass values resulting from experimental error that can occur when taking measurements.

As used herein, unless expressly stated otherwise, "operable" means able to be used, fit or ready for use or service, usable for a specific purpose, and capable of performing a recited or desired function described herein. In relation to systems and devices, the term "operable" means the system and/or the device is fully functional and calibrated, comprises elements for, and meets applicable operability requirements to perform a recited function when activated. In relation to systems and circuits, the term "operable" means the system and/or the circuit is fully functional and calibrated, comprises logic for, and meets applicable operability requirements to perform a recited function when activated.

The invention claimed is:

1. A system for pointing a searchlight onboard a vehicle, the system comprising:
   a processor;
   a position determination module configured to determine a vehicle position of the vehicle and an onboard searchlight;
   an airborne mobile platform module configured to determine a vehicle orientation of the vehicle based on a pitch, a roll, and a yaw of the vehicle; and
   an electronic moving map module configured to:
   receive a desired destination to be illuminated by the onboard searchlight;
   compute a route to the desired destination based on the vehicle orientation and the vehicle position; and
   guide the vehicle to the desired destination by pointing the onboard searchlight along the route in a direction of the desired destination;
   a searchlight pointing module configured to:
   point the onboard searchlight to the desired destination;
   record an azimuth and an elevation reading of the onboard searchlight to provide recorded azimuth and ground elevation data of the desired destination; and
   compute a pointing coordinate for the onboard searchlight based on the desired destination, the vehicle orientation, the route, and the recorded azimuth and ground elevation data.

2. The system of claim 1, wherein the searchlight pointing module is further configured to maintain the onboard searchlight at the desired destination to be illuminated using a maneuvering mechanism.

3. The system of claim 1, wherein the onboard searchlight is further configured to illuminate the desired destination.

4. The system of claim 1, wherein the electronic moving map module is further configured to determine an exact location illuminated by the onboard searchlight to provide an illuminated location.

5. The system of claim 1, wherein the position determination module comprises one of a GPS system and an inertia reference unit.

6. The system of claim 1, wherein the desired destination to be illuminated and an illuminated location are each identified by at least one member selected from the group consisting of: an address on a map, and longitude and latitude coordinates.

7. The system of claim 1, wherein the vehicle comprises an aircraft.

8. A method for pointing a searchlight onboard a vehicle, the method comprising:
   determining, by a position determination module coupled to a processor, a vehicle position of the vehicle and an onboard searchlight;
   determining, by an airborne mobile platform module coupled to the processor, a vehicle orientation of the vehicle based on a pitch, a roll, and a yaw of the vehicle;
   identifying, by an electronic moving map module coupled to the processor, a desired destination to be illuminated by the onboard searchlight;
   computing, by the electronic moving map module coupled to the processor, a route to the desired destination-based on the vehicle orientation and the vehicle position;
   guiding, by the electronic moving map module coupled to the processor, the vehicle to the desired destination to be illuminated by pointing the onboard searchlight along the route in a direction of the desired destination;
   pointing, by a searchlight pointing module coupled to the processor, the onboard searchlight to the desired destination;

recording, by the searchlight pointing module coupled to the processor, by action of the processor an azimuth and an elevation reading of the onboard searchlight to provide recorded azimuth and ground elevation data of the desired destination; and computing, by the searchlight pointing module coupled to the processor, a pointing coordinate for the onboard searchlight based on the desired destination, the vehicle orientation, the route, and the recorded azimuth and ground elevation data of the desired destination.

9. The method of claim 8, further comprising maintaining the onboard searchlight on the desired destination to be illuminated using a maneuvering mechanism based on the pointing coordinate.

10. The method of claim 8, further comprising determining the position of the vehicle and the onboard searchlight using one of: a GPS system, and an inertia reference unit.

11. The method of claim 8, further comprising identifying the desired destination to be illuminated by one of: an address on a map, and a longitude and latitude coordinates.

12. A method for identifying a location illuminated by an onboard searchlight on a vehicle, the method comprising:

illuminating, by an electronic moving map module coupled to a processor, a location of interest on ground at an illuminated location illuminated by the onboard searchlight;

determining, by a position determination module coupled to the processor, a vehicle position of the vehicle and the onboard searchlight;

determining, by an airborne mobile platform module coupled to the processor, a vehicle orientation of the vehicle based on a pitch, a roll, and a yaw of the vehicle;

recording, by a searchlight pointing module coupled to the processor, an azimuth and an elevation of the onboard searchlight to provide recorded azimuth and ground elevation data;

computing, by the searchlight pointing module coupled to the processor, a pointing coordinate for the onboard searchlight illuminating the illuminated location based on the vehicle orientation, the vehicle position, and the recorded azimuth and ground elevation data; and calculating, by the searchlight pointing module coupled to the processor, the illuminated location of the location of interest on the ground in response to the onboard searchlight hitting the ground based on the pointing coordinate.

13. The method of claim 12, further comprising determining the position of the vehicle and the onboard searchlight using one of a GPS system and an inertia reference unit.

14. The method of claim 12, wherein the illuminated location is calculated using one of: an address on a map, and a longitude and latitude coordinate.

15. The method of claim 12, wherein the vehicle comprises an aircraft.

16. A system for identifying a location illuminated by an onboard searchlight on a vehicle, the system comprising:

an onboard searchlight configured to illuminate a location of interest on ground at an illuminated location;

a processor;

a position determination module configured to determine a vehicle position of the vehicle and an onboard searchlight;

an airborne mobile platform module configured to determine a vehicle orientation of the vehicle based on a pitch, a roll, and a yaw of the vehicle;

a searchlight pointing module configured to:

record an azimuth and an elevation of the onboard searchlight to provide recorded azimuth and ground elevation data; and compute a pointing coordinate for the onboard searchlight based on the vehicle orientation, the vehicle position, and the recorded azimuth and elevation data; and an electronic moving map module configured to calculate the illuminated location of the location of interest on the ground in response to the onboard searchlight hitting the ground based on the pointing coordinate.

17. The system of claim 16, wherein the searchlight pointing module is further configured to maintain the onboard searchlight on the illuminated location using a maneuvering mechanism.

18. The system of claim 16, wherein the position determination module comprises one of: a GPS system, and an inertia reference unit.

19. The system of claim 16, wherein the illuminated location is identified by at least one member selected from the group consisting of: an address on a map, and longitude and latitude coordinates.

20. The system of claim 16, wherein the vehicle comprises an aircraft.

* * * * *